United States Patent
Gousios et al.

(10) Patent No.: US 12,430,446 B1
(45) Date of Patent: Sep. 30, 2025

(54) SOFTWARE COMPOSITION ANALYSIS (SCA) TO IDENTIFY AI-GENERATED CODE THAT IS COPIED CODE FROM THIRD-PARTY LIBRARIES

(71) Applicant: Endor Labs Inc, Palo Alto, CA (US)

(72) Inventors: Georgios Gousios, Delft (NL); Thomas Durieux, Palo Alto, CA (US); Philip Hamer, Palo Alto, CA (US); Joseph Hejderup, Palo Alto, CA (US); Camilla Odlund, Palo Alto, CA (US); Anand Ashok Sawant, Davis, CA (US); Dimitrios Styliadis, San Jose, CA (US)

(73) Assignee: Endor Labs Inc, Palo Alto, CA (US)

(*) Notice: Subject to any disclaimer, the term of this patent is extended or adjusted under 35 U.S.C. 154(b) by 0 days.

(21) Appl. No.: 19/170,903

(22) Filed: Apr. 4, 2025

Related U.S. Application Data

(60) Provisional application No. 63/708,742, filed on Oct. 17, 2024.

(51) Int. Cl.
  *G06F 21/57* (2013.01)
  *G06F 8/71* (2018.01)

(52) U.S. Cl.
  CPC .......... *G06F 21/577* (2013.01); *G06F 8/71* (2013.01); *G06F 2221/033* (2013.01)

(58) Field of Classification Search
  None
  See application file for complete search history.

(56) References Cited

U.S. PATENT DOCUMENTS

| | | | |
|---|---|---|---|
| 10,229,251 B1* | 3/2019 | Dalessio | G06F 8/71 |
| 10,628,577 B2* | 4/2020 | Koohgoli | G06F 8/71 |
| 2019/0079734 A1* | 3/2019 | Kadam | G06F 21/577 |
| 2025/0061207 A1* | 2/2025 | Jordan | G06F 21/577 |

\* cited by examiner

*Primary Examiner* — Fatoumata Traore
(74) *Attorney, Agent, or Firm* — Flagship Patents; Shiv S. Naimpally

(57) ABSTRACT

In some examples, a code file in a development system is selected and the selected code file is segmented, using a language-specific parser, to create multiple parsed blocks. A block of the multiple parsed blocks is selected and a cryptographic hash function used to create a block signature that uniquely identifies the selected block. The block signature is compared to multiple signatures of blocks in third-party libraries. The multiple signatures are stored in an index. When the block signature matches one of the multiple signatures of blocks in third-party libraries, the index is used to determine a source file from which the selected block was copied. Vulnerabilities included in the source file and fixes to address the vulnerabilities are identified to enable a software developer to apply the fixes to the identified vulnerabilities.

20 Claims, 9 Drawing Sheets

SOFTWARE COMPOSITION ANALYSIS (SCA) TO IDENTIFY AI-GENERATED CODE THAT IS COPIED CODE FROM THIRD-PARTY LIBRARIES

The present non-provisional patent application claims priority from U.S. Provisional Application 63/708,742 filed on Oct. 17, 2024 which is incorporated herein by reference in its entirety and for all purposes as if completely and fully set forth herein.

BACKGROUND

Software applications increasingly rely on third-party components, many of which are released under an open-source license. For example, most applications depend directly and/or indirectly on such components. While the application developer will typically declare a direct dependency on such a component, an indirect (transitive) dependency is usually not declared.

Software composition analysis (SCA) involves identifying names (identifiers) and versions of third-party components included in an application. With some programming languages, SCA may be performed by analyzing the packages included in package manifests, where developers explicitly declare their dependencies. However, declaring dependencies (and consequently, software composition analysis) is not possible when the programming environment does not include a package manager. This is particularly true for older languages, like C and C++, and for niche languages. In addition, dependencies may not be identified when developers copy third-party code into their code bases either manually or through a script. Copied third-party code includes (a) code that is copied and placed, without modification, into a software application and (b) code that is copied, tweaked (undergoes relatively small modifications), and the tweaked code placed into the software application.

When a package manager is unavailable, developers either (1) use a host operating system to provide dependency packages or (2) copy the third-party component source code into the application. The first makes building software harder, as compatible operating system versions need to be installed before a software package can be built. Thus, most developers select the second option and copy code. To copy the source code, developers select a version of the code, usually a most current version. The developers usually do not keep an inventory of the code and versions that were copied. The copying may be selective. For example, developers may copy up to a few files from a large external project. In some cases, the developers may modify the copied content, such as by removing the license, adding and/or removing code, and so on. While copying code has immediate productivity benefits, it incurs technical debt. Specifically, generating a Software Bill Of Materials (SBOM) is impossible without the developers recording the precise version of the copied material.

With the availability of artificial intelligence (AI), software developers may use AI to generate code. In such cases, the generated code is based on code from third-party libraries that was used to train the AI. Thus, the software developers may be unaware of the original code from which the generated code was derived and therefore unaware of any issues (e.g., vulnerabilities) present in the original code which are also present in the generated code.

When developers copy code from a third-party library and add it to an application, the developers should, ideally, monitor the source from which they copied for vulnerabilities so that if vulnerabilities are found, the developers can address them. If not, the developers may introduce vulnerabilities, from the code that was copied or generated by AI, into their own applications. An additional issue with copying code into an application has to do with licensing incompatibilities. The copied code or AI generated code might have a license that restricts its redistribution in compiled form, exposing the client application to legal risks.

Thus, when a developer copies code from a third-party library or uses AI to generate code and inserts the code (with or without modification) into an application that the developer is creating, the developer may introduce vulnerabilities and/or licensing incompatibilities into the application. Depending on the software language, these issues may not be easily determined and may cause issues when the application is completed and offered for use.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a code file in a development system is selected to create a selected code file. A programming language included in the selected code file is identified. A language-specific parser is selected based on the programming language, and the selected code file is segmented, using the language-specific parser, to create multiple parsed blocks. The multiple parsed blocks include: function definition blocks, file license blocks, and remaining blocks. A block of the multiple parsed blocks is selected to create a selected block. A cryptographic hash function is used on the selected block to create a block signature that uniquely identifies the selected block. The block signature is compared to multiple signatures of blocks in third-party libraries. The multiple signatures are located in an index. Based at least in part on determining that the block signature matches one of the multiple signatures of blocks in third-party libraries, the index is used to determine a source file from which the selected block was copied. A source file identifier associated with the source file is added to a software composition report of the selected code file. Based on the software composition report, one or more vulnerabilities included in the source file are identified to create identified vulnerabilities. Based on the one or more vulnerabilities, one or more fixes to address the vulnerabilities are identified. The software composition report, the identified vulnerabilities, and the one or more fixes are provided to a software developer associated with the selected code file to enable the software developer to apply the identified fixes to the identified vulnerabilities.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
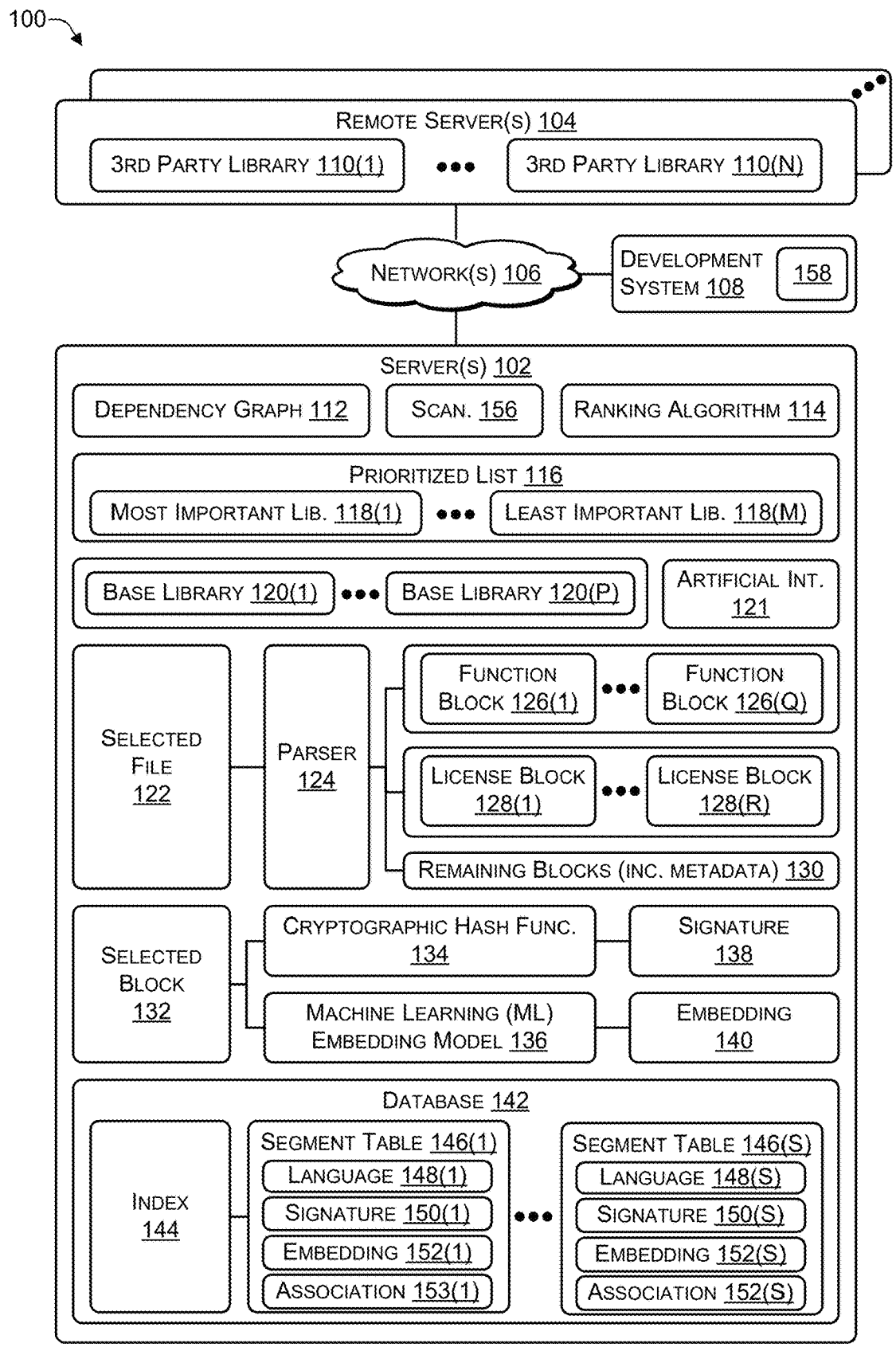
FIG. 1 illustrates a system to create an index of frequently used third-party libraries, according to some embodiments.

It should be understood, that the following descriptions, while indicating preferred aspects and numerous specific details thereof, are given by way of illustration only and should not be treated as limitations. Changes and modifications may be made within the scope herein without departing from the spirit and scope thereof, and the present invention herein includes all such modifications.

The systems and techniques described herein perform software composition analysis (SCA) on software applications to identify the third-party sources from which code was copied, even if the code was copied and modified. Performing SCA involves two steps: (1) creating an index of the source code of libraries from which code is frequently copied (creating dependencies), along with associated metadata and (2) dividing an application into blocks and comparing individual blocks to the index to identify sources of copied code.

Indexing code in third-party libraries includes identifying candidates to index and indexing the candidates at a particular level (e.g., file, function, code block or the like) using suitable indexing structures. Indexing converts a versioned source code file (in a third-party library) into a representation that can be queried and retrieved on request. Building an index that can support a large volume of queries at a high level of precision (e.g., how relevant are the returned results?) and recall (e.g., have all the relevant results been provided?) may be broadly divided into: (1) segmenting individual files into multiple segments, (2) creating a signature for individual segments of the multiple segments, and (3) storing meta information, along with the signatures, in a database.

Segmentation includes performing file indexing at a low level. For example, for a particular source code file, use an appropriate programming language parser to extract (1) function definitions and (2) file license blocks. The remaining code, such as, for example, data structure declarations, constants, and the like are put into at least one special block called a remaining block. If the remaining block exceeds a pre-defined (maximum) length, then the remaining block may be further divided into multiple additional blocks. The output of segmenting a file may include (i) several functions (function blocks), (ii) one or more licenses, and (iii) one or more remaining blocks that were included in the file.

Creating representations uses the blocks produced by the segmentation process to determine at least 2 types of signatures per block, referred to as a signature and an embedding. The first type of representation ("signature") is created by applying a strong cryptographic hash function, such as SHA256, to the string contents of individual blocks. The resulting output is a string that uniquely identifies individual blocks. The second type of representation ("embedding") is created by providing individual blocks as input to a machine learning embedding model that creates an embedding. The embedding is a floating-point vector representation of the source code, where the floating-point vector representation has a predefined size. A reference to individual blocks, along with the signature and the embedding associated with individual blocks is stored in an index. A signature comparison is done between the signature of a block of project code and the signatures in the index. The term project code (also called client code) refers to code in a development system. A match (exact match) between the signatures indicates an exact copy, e.g., the block in the project code is identical to a block in third-party code. If the signature comparison does not result in a match, then a comparison of embeddings is done between the embedding of a block of project code and embeddings in the index. The embedding comparison identifies code that is similar but not identical, indicating that code was copied from the third-party library and then modified. The embedding comparison may result in multiple results (multiple embeddings in the index matching the embedding of the project code), with each result of the multiple results having an associated similarity measurement to embedding of the project code. For example, the similarity measurement may be a vector cosine distance, a Jaccard index, a simple matching coefficient, a Hamming distance, a Sorensen-Dice coefficient, a Tversky index, or a Tanimoto distance, or similar measurement calculated between two embeddings. Vector cosine distance (also called Cosine similarity) is a measure of similarity between two non-zero vect. Cosine similarity is the cosine of the angle between the vectors calculated using the dot product of the vectors divided by the product of their lengths. Given two n-dimensional vectors of attributes, A and B, the cosine similarity, $\cos(\theta)$, may be represented using a dot product and magnitude as:

$$\text{cosine similarity} = S_C(A, B) := \cos(\theta) = \frac{A \cdot B}{\|A\|\|B\|} = \frac{\sum_{i=1}^{n} A_i B_i}{\sqrt{\sum_{i=1}^{n} A_i^2} \cdot \sqrt{\sum_{i=1}^{n} B_i^2}},$$

where $A_i$ and $B_i$ are the $i^{th}$ components of vectors A and B, respectively.

For example, two proportional vectors have a cosine similarity of 1, two orthogonal vectors have a similarity of 0, and two opposite vectors have a similarity of −1. In some contexts, the component values of the vectors cannot be negative, in which case the cosine similarity is bounded in To determine whether project code (in a development system) includes copied code, the files in a development system are scanned and segmented based on a programming language (C, C++, Java, Python, and the like) and the index to determine whether individual files in the development system include blocks that are exact copies or partial copies of files in third-party libraries (repositories).

To analyze files in a development system, a project code file is selected to create a selected file. The selected file is segmented using a process similar to the indexing process, e.g., the selected file is parsed to extract (1) function definitions, (2) file license blocks, and (3) REST block(s). A unique signature and an embedding are created for individual blocks from the selected file using a cryptographic hash function and a machine learning embedding model, respectively. Using the resulting set of signatures and set of embeddings created from the selected file, the index is queried to determine the most probable repository (third-party library) versions from where the blocks in the selected file are copied (including directly copied or copied and modified). The signature matching is done by using exact matches. The signature of a particular block in the selected file either exists or does not exist in the index. If the signature does not exist in the index, then an embedding of the particular block is compared to embeddings in the index and a set of matching embeddings is identified. The embedding matching may use, for example, a vector cosine distance (or similar measurement) as a measure of how close a match (1) an embedding entry in the index is to (2) the embedding from the selected file. The embedding matching may return a top-N (with N being user configurable) code segments in the index that are closest to a query vector. Embedding matching is performed if there is no exact signature match for a particular code segment. The embedding matches identify derivatives of original files in third-party libraries (repositories) included in the selected file. The embedding matches result in an ordered list (set) of source repository versions from which portions of the selected file have been copied. The order of the matches is determined based on a vector cosine distance (or similar measurement), with the first entry being the closest match and the last entry being the Nth closest match. In some cases, the order may reflect a version of a file from which the code was copied, before being modified. For example, the closest match may be a particular version of a file in a third-party library (repository) from which the code was copied and modified, the next closest match may be a different version of the same file, and so on.

Project code that uses (e.g., has a dependency) on a third-party component is typically upgraded when there is a newer version that is "better" than the current version that is currently being used by the project code. A newer version that is better means the newer version addresses issues (e.g., vulnerabilities) present in the current version and, based on an analysis of the dependency graph, does not appear to introduce new issues. The systems and techniques described herein identify sources of code segments that were copied (either directly copied or copied and modified). After identifying the source files in third-party libraries (repositories), the systems and techniques may determine if there are vulnerabilities present by accessing one or more vulnerability databases. After identifying the vulnerabilities, the systems and techniques may identify associated fixes addressing the vulnerabilities, thereby enabling developers to improve the quality and security of the software code that includes code copied from third-party libraries. In addition, the systems and techniques may identify licensing incompatibilities and suggest ways in which the incompatibilities may be addressed.

As a first example, a computer-implemented method includes selecting a code file in a development system to create a selected code file, identifying a programming language included in the selected code file, selecting a language-specific parser based on the programming language, and segmenting the selected code file, using the language-specific parser, to create multiple parsed blocks. The multiple parsed blocks include: function definition blocks, file license blocks, and remaining block(s). The computer-implemented method includes selecting a block of the multiple parsed blocks to create a selected block, creating, using a cryptographic hash function and based on the selected block, a block signature that uniquely identifies the selected block, and comparing the block signature to multiple signatures of blocks in third-party libraries. The multiple signatures are located in an index stored in a database. Based at least in part on determining that the block signature matches one of the multiple signatures of blocks in third-party libraries, the computer-implemented method comprises determining, using the index, a source file from which the selected block was copied and adding a source file identifier associated with the source file to a software composition report of the selected code file. The computer-implemented method includes identifying, based on the software composition report, one or more vulnerabilities included in the source file to create identified vulnerabilities, identifying, based on the one or more vulnerabilities, one or more fixes to address the vulnerabilities to create identified fixes, and providing the software composition report, the identified vulnerabilities, and the identified fixes to a software developer associated with the selected code file to enable the software developer to apply the identified fixes to the identified vulnerabilities. The computer-implemented method may include determining, based on the software composition report, one or more licensing incompatibilities associated with the selected code file and providing one or more suggestions on addressing the one or more licensing incompatibilities associated with the selected code file. The computer-implemented method may include creating, using a machine learning embedding model and based on the selected block, a block embedding comprising a floating-point vector representation of the selected block. Based at least in part on determining that the block signature fails to match any of the multiple signatures of the blocks in the third-party libraries, the computer-implemented method may include comparing the block embedding to multiple embeddings of the blocks in the third-party libraries, where the multiple embeddings are located in the index. The computer-implemented method may include determining that the block embedding matches, in the index, one or more embeddings of the multiple embeddings of the blocks in the third-party libraries, determining, using the index and based on the one or more embeddings that match the block embedding, one or more additional source files, and adding the one or more additional source files to the software composition report of the selected code file. The computer-implemented method may include ordering the one or more embeddings that match the block embedding based on a similarity measure to create an ordered set of matching embeddings ordered from closest match to least closest match. For example, the similarity measure may comprise a vector cosine distance. The computer-implemented method may include determining a size of the remaining block(s) and based on determining that the size of the remaining block(s) exceeds a predetermined size, the computer-implemented method may include dividing the remaining blocks into smaller remaining blocks. The computer-implemented method may include identifying, based on the software composition report, one or more licensing incompatibilities and providing at least one suggestion to address the one or more licensing incompatibilities.

As a second example, a server includes one or more processors and one or more non-transitory computer readable media storing instructions executable by the one or more processors to perform various operations. The operations include selecting a code file in a development system to create a selected code file, identifying a programming language included in the selected code file, selecting a language-specific parser based on the programming language, and segmenting the selected code file, using the language-specific parser, to create multiple parsed blocks. The multiple parsed blocks include: function definition blocks, file license blocks, and remaining block(s). The operations include selecting a block of the multiple parsed blocks to create a selected block. The operations include creating, using a cryptographic hash function and based on the selected block, a block signature that uniquely identifies the selected block. The operations include comparing the block signature to multiple signatures of blocks in third-party libraries. The multiple signatures are located in an index. Based at least in part on determining that the block signature matches one of the multiple signatures of blocks in third-party libraries, the operations include determining, using the index, a source file from which the selected block was copied and adding a source file identifier associated with the source file to a software composition report of the selected code file. The operations include identifying, based on the software composition report, one or more vulnerabilities included in the source file to create identified vulnerabilities. The operations include identifying, based on the one or more vulnerabilities, one or more fixes to address the vulnerabilities to create identified fixes. The operations include providing the software composition report, the identified vulnerabilities, and the identified fixes to a software developer associated with the selected code file to enable the software developer to apply the identified fixes to the identified vulnerabilities. Creating the index may include: determining a dependency graph for individual third-party software libraries of multiple software libraries to create multiple dependency graphs of the multiple software libraries, merging the dependency graphs to create a consolidated dependency graph, and creating, using a ranking algorithm, a prioritized set of libraries ranked in order of importance, the prioritized set of libraries including no more than a predetermined number of libraries. For example, the ranking algorithm comprises PageRank. The operations may include determining, based on the prioritized set of libraries, one or more libraries that do not include copied code, designating the one or more libraries that do not include copied code as base libraries, and creating the index using the base libraries. The operations may include receiving a request to add a new library to the index. Based on determining that a portion of the new library is already included in the index, the operations may include identifying a particular library of the third-party libraries from which the portion originated and adding information to the index indicating that the portion of the new library originated from the particular library. The source file identifier may include a file identifier identifying the source file and a version identifier identifying a version of the source file. The remaining block(s) may include data structure declarations and constants from the selected file.

As a third example, one or more non-transitory computer readable media are capable of storing instructions executable by one or more processors to perform various operations. The operations include selecting a code file in a development system to create a selected code file, identifying a programming language included in the selected code file, selecting a language-specific parser based on the programming language, and segmenting the selected code file, using the language-specific parser, to create multiple parsed blocks. The multiple parsed blocks include: function definition blocks, file license blocks, and remaining block(s). The operations include selecting a block of the multiple parsed blocks to create a selected block, creating, using a cryptographic hash function and based on the selected block, a block signature that uniquely identifies the selected block, and comparing the block signature to multiple signatures of blocks in third-party libraries. The multiple signatures are located in an index. Based at least in part on determining that the block signature matches one of the multiple signatures of blocks in third-party libraries, the operations include determining, using the index, a source file from which the selected block was copied and adding a source file identifier associated with the source file to a software composition report of the selected code file. The operations include identifying, based on the software composition report, one or more vulnerabilities included in the source file to create identified vulnerabilities, identifying, based on the one or more vulnerabilities, one or more fixes to address the vulnerabilities to create identified fixes, and providing the software composition report, the identified vulnerabilities, and the identified fixes to a software developer associated with the selected code file to enable the software developer to apply the identified fixes to the identified vulnerabilities. The operations may include determining, based on the software composition report, one or more licensing incompatibilities associated with the selected code file and providing one or more suggestions on addressing the one or more licensing incompatibilities associated with the selected code file. The operations may include creating, using a machine learning embedding model and based on the selected block, a block embedding comprising a floating-point vector representation of the selected block. Based at least in part on determining that the block signature fails to match any of the multiple signatures of the blocks in the third-party libraries, the operations may include comparing the block embedding to multiple embeddings of the blocks in the third-party libraries. The multiple embeddings are located in the index. The operations may include determining that the block embedding matches, in the index, one or more embeddings of the multiple embeddings of the blocks in the third-party libraries. The operations may include determining, using the index and based on the one or more embeddings that match the block embedding, one or more additional source files and adding the one or more additional source files to the software composition report of the selected code file. The operations may include ordering the one or more embeddings that match the block embedding based on a similarity measure to create an ordered set of matching embeddings ordered from closest match to least closest match. The similarity measure includes a vector cosine distance. The operations may include determining a dependency graph for individual third-party software libraries of multiple software libraries to create multiple dependency graphs of the multiple software libraries, merging the dependency graphs to create a consolidated dependency graph, and creating, using a ranking algorithm, a prioritized set of libraries ranked in order of importance. The prioritized set of libraries include no more than a predetermined number of libraries. The operations may include determining, based on the prioritized set of libraries, one or more libraries that do not include copied code, designating the one or more libraries that do not include copied code as base libraries, and creating the index using the base libraries. The source file identifier may include: (1) a file identifier identifying the source file and (2) a version identifier identifying a version of the source file.

FIG. 1 illustrates a system 100 to create an index of frequently used third-party libraries, according to some embodiments. The system 100 includes at least one server 102 connected to one or more remote servers 104 via one or more networks 106. A development system 108 may be connected to both the remote servers 104 and the servers 102 via the one or more networks 106. The remote servers 104 may be used to store ("host") third-party libraries 110(1) to 110(N) (N>0). The third-party libraries 110 may include, for example, open-source libraries (also referred to as repositories).

Identifying Projects to Index

Theoretically, all the third-party libraries 110 may be candidates from which source code is copied. However, in practice, only a relatively small number of the third-party libraries 110 are the sources from which developers copy code. Identifying the most frequently copied libraries from millions of libraries is crucial to the construction of a useful index. Identifying the most frequently copied libraries may include using information from package managers and the like. For example, a ranking algorithm 114, such as PageRank, may be applied to a dependency graph 112 to create a prioritized list 116 of the libraries, ranking a most important library 118(1) to a least important library 118(M) (M>0). For example, a user may set the value of M so that the prioritized list 116 includes the top 10, 20, 25, 50, or the like most used of the third party libraries 110. While some of the examples provided herein are with reference to C/C++ code, it should be understood that similar techniques may be applied to other programming languages.

For C/C++, open-source software distributions and operating systems, such as Debian and FreeBSD, have been packaging and distributing C/C++ libraries for decades. The distribution is based on the dependency graph 112, where Debian/FreeBSD developers have annotated packages with dependency information. For example, if project A at version 1 (A @v1) depends on project B at version 2 (B@v2), the package manager automatically installs B@v2 prior to A@v1. Dependency information may be extracted from the package managers (e.g., Debian and FreeBSD) and the package names replaced with the originating source code libraries (repositories). Several techniques may be used to perform this mapping, ranging from information in the package managers themselves to using AI to parse the project README files to extract online locations of source code repositories. The resulting library graphs from multiple sources are merged together to create the dependency graph 112. A ranking algorithm 114, such as the PageRank algorithm, may be used on the dependency graph 112 to create the prioritized list 116, resulting in the prioritized list 116 of libraries, in order of importance based on the dependency graph 112. The prioritized list 116 includes M libraries (M>0) listed in a priority order, from a most important library 118(1) (e.g., most copied library) to a least important library 118(M) (e.g., less copied library), that are used to create an index 144.

The prioritized list 116 of libraries (repositories) may, in some cases, include libraries that have copied code from other libraries, thereby complicating the task of identifying source libraries of application code in the development system 108. To address this issue, heuristics are applied, such as using an artificial intelligence (AI) 121 to perform source code identification, to identify base libraries 120(1) to 120(P) (P>0) that do not include (exclude) copied code.

The indexing process uses the base libraries (repositories) 120 to create an initial version of the index 144. For any subsequent library (repository) that is to be added to the index 144, a scan (described below) may be performed to determine whether portions of the subsequent library are already in the index. If copied files are identified in the subsequent library, then the originating library, from which portions were copied, is noted so that there is a record of the relationship between the subsequent library and the originating library.

Indexing

Indexing is the process of converting a versioned file from the third-party libraries 110 into a representation that can be queried (compared against) and retrieved on request. To build an index that can support a large volume of queries at a high level of precision (the results relevant?) and recall (have all relevant results been provided?), the index 144 is created as follows: (1) files are segmented, (2) representations are created for each segment, and (3) the representations, along with meta data, are stored in a database.

Segmentation

File indexing may be performed at a relatively low level to identify code copied from the third-party libraries 110. Individual files from the libraries 120 are selected and segmented. For a selected file 122 (source code file), a programming language specific parser 124 may be used to extract (1) function definitions, shown as function blocks 126(1) to 126(Q) (Q>0), (2) license blocks 128(1) to 128(R) (R>0), and (3) remaining blocks 130. The remaining blocks 130 include code that is not included in a function definition and not included in a license block, such as, for example, data structure declarations, constants, metadata, and the like. If a size of the remaining blocks 130 is greater than a pre-defined maximum length, then the remaining blocks 130 may be further divided into multiple blocks. The result of segmentation of the selected file 122 are multiple blocks that include function blocks 126, license blocks 128, and remaining blocks 130. The blocks 126, 128, 130 are also referred to herein as segments because they have been created using a segmentation process.

Representations of Individual Blocks

An individual block of the function blocks 126, license blocks 128, and remaining blocks 130 is selected. For a selected block 132, two representations are created: (1) a unique representation to enable identifying code that has been copied, without modification, into the development system 108 and (2) a representation that indicates a similarity of code to enable identifying code that has been copied and modified before being included in the development system 108. The first (unique) representation is created by using a cryptographic hash function 134, such as SHA256, on the string contents of the selected block 132 to create a signature 138 that uniquely identifies the selected block 132. The second representation, an embedding 140, is created by processing the contents of the selected block 132 using a machine learning embedding model 136. The embedding 140 is a floating-point vector representation, having a pre-defined size, of the selected block 132.

A database 142 or similar storage structure may be used to store the index 144. The index 144 is queried to identify code in the development system 108 that has been copied, either without modification or with modification, into the development system 108. The database 142 keeps track of the original library, associated versions, and files in those versions (versioned files). Signatures 150(1) to 150(S) (S>0) and embeddings 152(1) to 152(S) for blocks in individual files in the base libraries 120 are stored in segment tables 146(1) to 146(S). The signatures 150 include signatures, such as the signature 138, created by applying the cryptographic hash function 134 to selected blocks, such as the selected block 132. The embeddings 152 include embeddings, such as the embedding 140, created by applying the machine learning embedding model 136 to selected blocks, such as the selected block 132. The segment tables 146 are organized according to programming languages 148(1) to 148(S). An association 153 between a block representation (signatures 150, embeddings 152) and a file version in one of the base libraries 120 is recorded in the file segment table 146. The database 142 may use a schema that disentangles the blocks (segments) from the files that include the blocks, enabling multiple files to share the same block signatures when the multiple files share the same source code blocks. Such a schema enables de-duplicating segment signatures at a rate of ~50%. This reduction stems from the fact that most source code in third-party libraries (e.g., open source software libraries) is already duplicated and because many files do not change between versions.

A scanner 156 is used to analyze code in the development system 108 to perform a Software Composition Analysis (SCA) that identifies the base libraries 120 from which code was copied (with or without modification) into files 158 in the development system 108. The scanner 156 identifies programming languages in the individual files 158 in the development system 108 and then analyzes the files 158 according to the programming language, using the index 144 to determine whether the files 158 are partial clones (copied and modified) or exact clones (copied without modification) of blocks in the base libraries 120. The process of the scanner 156 performing the SCA on the files 158 in the development system 108 is described in more detail in FIG. 3.

Figure 2:
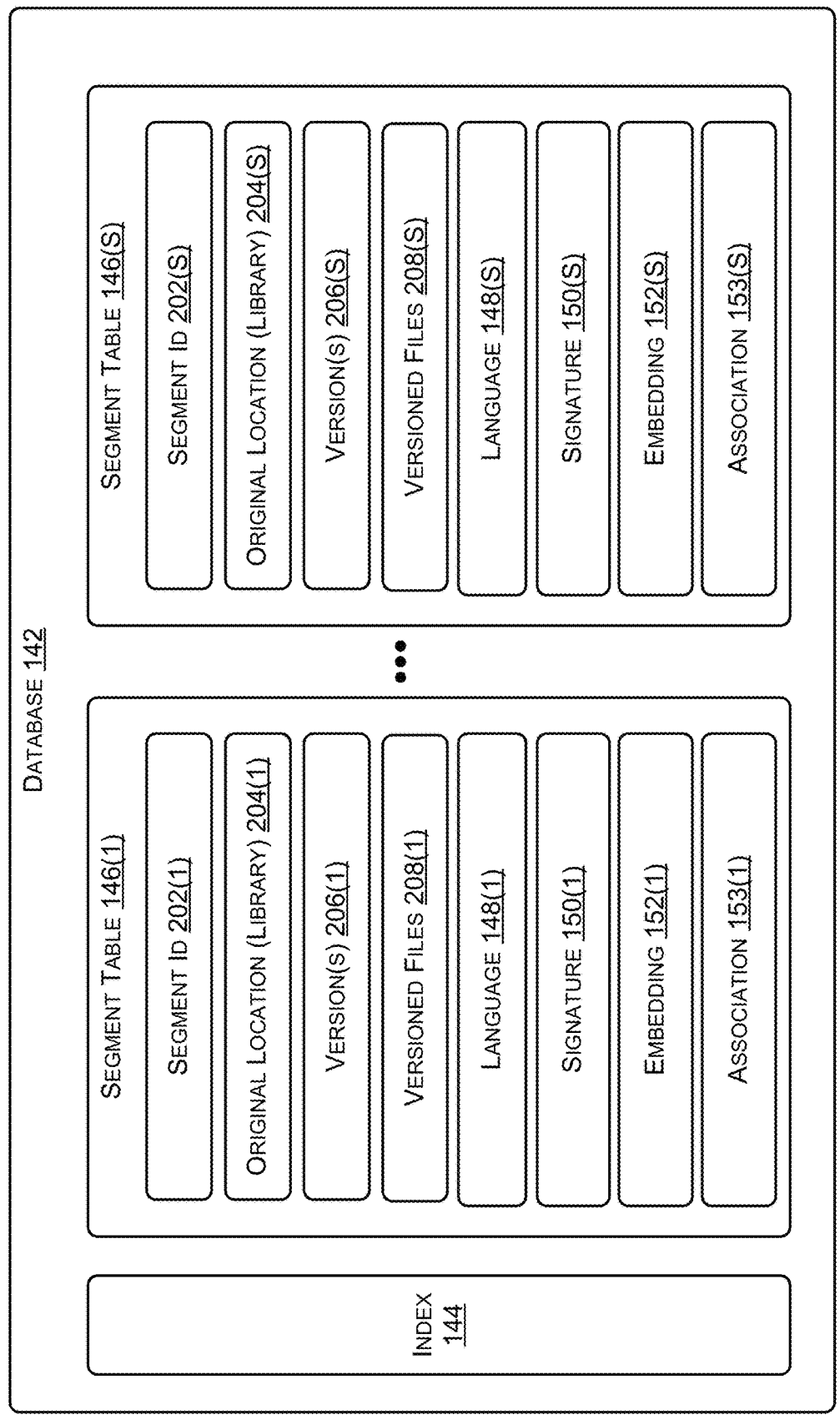
FIG. 2 illustrates a system that includes a database with an index, according to some embodiments.

Thus, a ranking algorithm is used on dependency graphs of third-party libraries, such as open-source software libraries, to create a prioritized list of libraries, ranking the top M (M>0) used libraries from most used to least used. From the prioritized list of libraries, AI is used to identify base libraries, e.g., the source libraries from which other libraries in the prioritized list of libraries have copied code. Individual files are selected from individual base libraries and parsed (segmented) into functions blocks, license blocks, and remaining blocks. Two representations are created for individual blocks (of the functions blocks, the license blocks, and the remaining blocks). The first representation is a signature created using a cryptographic hash function. The signature uniquely identifies an individual block. The second representation is an embedding created using a machine learning embedding model. The embedding is a vector of fixed length and is used to identify code that is similar (e.g., copied and modified code) to code in the base library. An index and segment tables are stored in a database to enable a scanner to analyze code in a development system to perform a software composition analysis that identifies which portions of the code being analyzed were copied (with or without modification) into files in the development system. By identifying the source files from which code was copied into the development system, the source files can be reviewed to determine vulnerabilities (e.g., using public vulnerability databases such as the National Vulnerability Database (NVD), Common Vulnerabilities and Exposure (NVE), Vulnerability Intelligence (VulnDB), Defense Information System Agency's (DISA) Information Assurance Vulnerability Alerts (IAVA), Open Vulnerability And Assessment Language (OVAL), Information Sharing and Analysis Centers (ISACs), the Mend Vulnerability Database, and other similar databases). A vulnerability is a flaw in software code that can be exploited by a malicious actor to cause unwanted actions, including unauthorized access to networks, data theft, and compromised systems. The vulnerabilities can be used to identify fixes and the fixes applied to the copied code in the development system to reduce vulnerabilities and improve a stability of the code in the development system. In addition, licensing incompatibilities may be identified and addressed FIG. 2 illustrates a system 200 that includes a database with an index, according to some embodiments. The system 200 illustrates an example of a schema that may be used to store the segment tables 146 in the database. Of course, other schemas that differ from the one illustrated in FIG. 2 may be used to achieve similar results.

Each of the segment tables 146(1) to 146(S) may include a segment identifier (Id) 202 identifying a segment (a block of the blocks 126, 128, 130 of FIG. 1) from the base libraries 120. An original location 204 field may identify which particular base library of base libraries 120 includes the segment id 202. The version(s) 206 field may identify one or more versions of the original location 204. The version files 208 field may identify the versions of files in the original location 204 that include the segment (block) associated with the segment id 202. The language 148 specifies the programming language of the segment referenced by the segment id 202. The signature 150 is a representation of the segment (block) referenced by the segment id 202 that uniquely identifies the segment. The cryptographic hash function 134 is used to create the signature 150. The embedding 152 is a representation of the segment (block) referenced by the segment id 202. The machine learning embedding model 136 is used to create the embedding 152. The association 153 identifies the association between the segment id 202 and the segment referenced by the segment id 202.

Scanning Project Code in Development System

Figure 3:
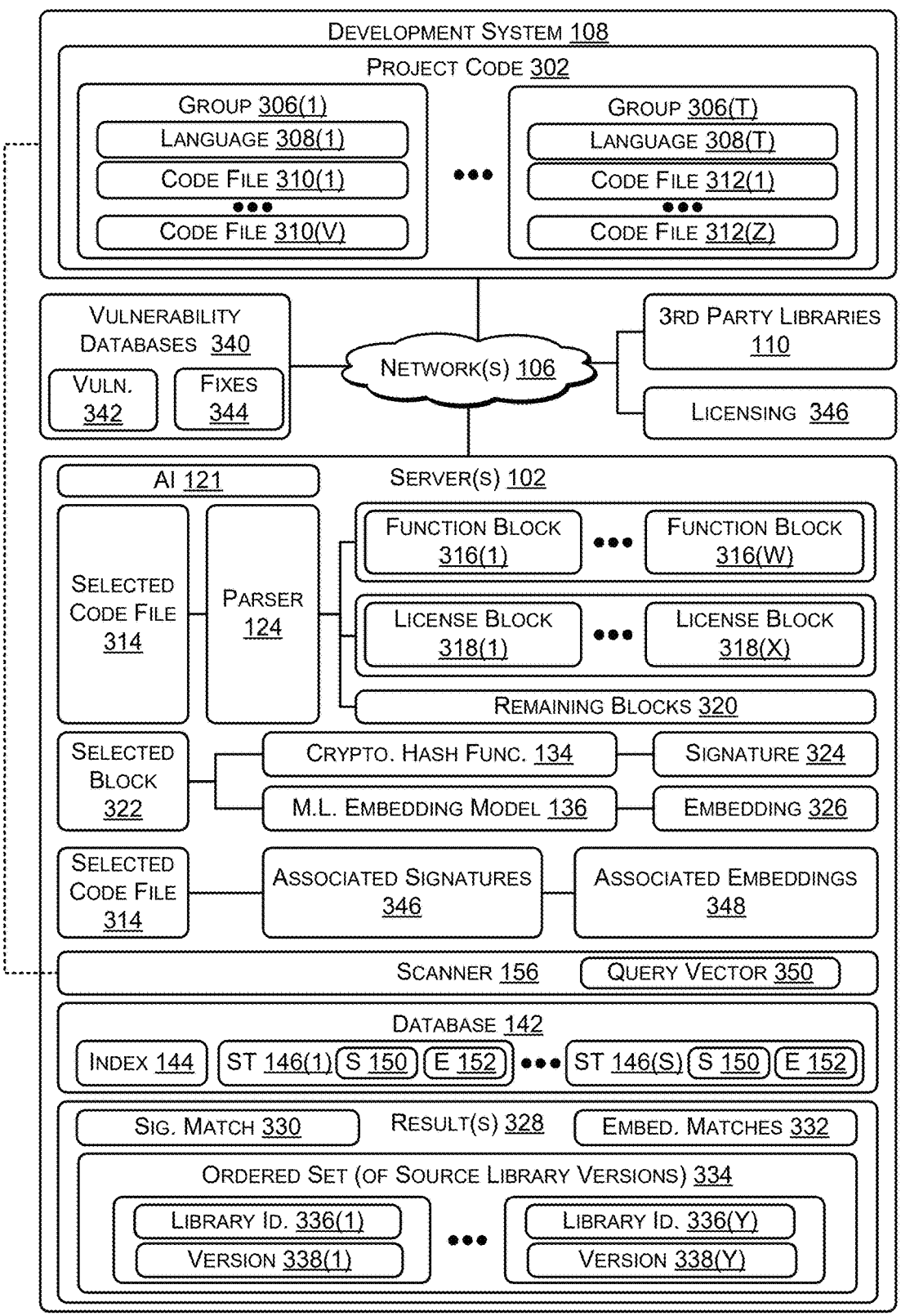
FIG. 3 illustrates a system to perform software composition analysis (SCA) of project code in a development system, according to some embodiments.

FIG. 3 illustrates a system 300 to perform software composition analysis (SCA) of project code in a development system, according to some embodiments. In the system 300, the scanner 156 performs an analysis of project code 302 in the development system 108 and uses the database 142 to determine results 328 that include a software composition analysis (SCA) identifying source libraries (and associated versions) from which code was copied into the project code 302.

The development system 108 includes project code 302 that includes multiple files. A scanner 304 may group (sort) the project code 302 into groups 306 according to a particular programming language 308. For example, group 306(1) may include code files 310(1) to 310(V) (V>0) that use programming language 308(1) and group 306(T) may include code files 312(1) to 312(Z) (Z>0) that use programming language 308(T) (T>0).

The scanner 156 identify programming languages in each of the code files 310, 312 and use the index 144 to determine whether the code files 310, 312 include copied code (with or without modification) and the source files (from which the code was copied) in the third-party libraries 110. Identifying the source files in the third-party libraries 110 enables software developers to use vulnerability databases 340 to identify vulnerabilities 341 in the code files 310, 312 and address the vulnerabilities 341 using fixes 342 (identified in the vulnerability databases 340 or elsewhere on the internet).

The scanner 156 processes the project code 302 to create representations (signatures and embeddings) for blocks of the project code 302. For example, the scanner 156 selects an individual code file of the code files 310, 312 to create a selected code file 314. Based on the language 308 associated with the selected code file 314, an appropriate parser 124 is selected. The programming language specific parser 124 may be used to extract (1) function definitions, shown as function blocks 316(1) to 316(W) (W>0), (2) license blocks 318(1) to 318(X) (X>0), and (3) remaining blocks 320. The remaining blocks 320 include code that is not included in a function definition and not included in a license block, such as, for example, data structure declarations, constants, metadata, and the like. If a size of the remaining blocks is greater than a pre-defined maximum length, then the remaining blocks may be further divided into multiple blocks. The result of segmentation of the selected code file 314 are multiple blocks that include function blocks 316, license blocks 318, and remaining blocks 320. The blocks 316, 318, 320 may also be referred to herein as segments because they have been created using a segmentation process.

An individual block of function blocks 316, license blocks 318, and remaining blocks 320 is selected. For a selected block 322, two representations are created: (1) a unique representation to enable identifying code that has been copied, without modification, into the development system 108 and (2) a representation that indicates code similarity to enable identifying code that has been copied and modified before being included in the development system 108. The first (unique) representation is created by using a cryptographic hash function 134, such as SHA256, on the string contents of the selected block 322 to create a signature 324 that uniquely identifies the selected block 322. The second representation, an embedding 326, is created by processing the contents of the selected block 322 through a machine learning embedding model 136. The embedding 326 is a floating-point vector representation, having a pre-defined size (vector length), of the selected block 132. The result of segmenting the selected code file 314 and creating at least two representations of individual blocks of the function blocks 316, the license blocks 318, and the remaining blocks 320 is a set of associated signatures 346 and a set of associated embeddings 348.

For individual code files of the code files 310, 312, such as the selected code file 314, the scanner 156 takes the set of associated signatures 346 and the set of associated embeddings 348 and queries the index 144 to determine results 328 that include the most probable third-party library versions (of the third-party libraries 110) from which code was copied. The signature matching is done using exact matching. If the signature 324 in the associated signatures 346 exactly matches one of the signatures 150 in the database 142, then the selected block 322 used to create the signature 324 was copied without modification from one of the third-party libraries 110 into the selected code file 314. When the signature 324 of the selected block 322 is a match to a signature 150 in the database 142, then the embedding 326 of the selected block 322 is not used because the exact match indicates directly copied code. The scanner 156 creates the results 328 of the software composition analysis that includes signature matches 330. For example, when the signature 324 of the selected block 322 is a match to a signature 150 in the database 142, then the matching signature 150 along with the source location and other related information may be included in the signature matches 330.

If the signature 324 of the selected block 322 fails to match the signatures 150 in the database 142, then the scanner 156 compares the embedding 326 of the selected block 322 with embeddings 152 in the database 142 to determine matches. The scanner 156 performs embedding matching, e.g., comparing individual embeddings of the associated embeddings 348 with the embeddings 152 associated with blocks in the third-party libraries 110, using vector cosine distance as a measurement. The scanner 156 determines the top-N (N>0, N user configurable) embeddings 152 that are closest to a query vector 350 using a similarity measure, such as vector cosine distance or the like. The resulting embedding matches 332 in the results 328. Comparing the embeddings 348 with the embeddings 152 identifies code, in the project code 302, that has been copied from the third-party libraries 110 and modified. In some cases, the query vector 350 may identify a range of versions of a particular file in the third-party libraries, as the particular file might not have changed among the range of versions. In such cases, the embedding matches 332 may indicate the range of versions or the most recent version of the particular file may be identified in the embedding matches 332. If a particular file is determined to be present in two libraries (e.g., because one library copied the file from the other library), then heuristics may be applied (e.g., using the AI 121) to determine the component names and versions.

Portions of the results 328 may be time ordered to create an ordered list of probable source repository versions from which the selected code file 314 has been copied. In some cases, portions of the results 328 may be aggregated to determine one (or a few, e.g., less than 5) versions of a source library of the third-party libraries 110, if multiple blocks may have been copied from a same source library version. The aggregation may be applied on a per identified source library level to find a version (or a range of versions) that satisfies all individual files. The results 328 include an ordered set of source library versions 334 identifying library identifiers 336 and associated versions 338 of the source libraries from which code was copied (with or without modification) into the project code 302.

By identifying the source files from the third-party libraries 110 and versions of code copied into the project code 302, developers can create a software bill of materials (SBOM), identify vulnerabilities 342 using vulnerability databases 340 that may be present in the project code 302, identify and mitigate (e.g., by applying fixes 344 to) the vulnerabilities 344, identify and address licensing 346 incompatibilities, and so on. For example, the copied code might have a license that restricts its redistribution in certain forms (e.g., compiled form), potentially exposing the developers to legal risks.

Thus, a code file in a development system may be selected and parsed to identify function blocks, license blocks, and remaining blocks. At least two representations, a signature and an embedding, are created for individual blocks of the function blocks, license blocks, and remaining blocks. The signature is created using a cryptographic hash function. The embedding is a floating-point vector representation of the source code of a predefined size. If a selected signature of the code file matches a signature in an index in a database, then the block used to create the selected signature is directly copied from a source block in a source library (third-party library). If the selected signature of a block fails to match signatures in the index in the database, then a selected embedding of the same block is compared to embeddings in the index. Using a similarity measure, such as vector cosine distance or the like, a set of the top N embedding matches is determined and ordered according to the similarity measure, e.g., from most similar to least similar. In some cases, further aggregation may be performed on the results. The results identify source libraries from which source code was directly (without modification) copied and source libraries from which source code was copied and modified. Where source code was copied and modified, a similarity measure indicates how close a match the copied and modified code is to the original source code. The systems and techniques identify the source files and versions of code copied from third party libraries into project code, thereby enabling creating a software bill of materials (SBOM) to enable developers to identify vulnerabilities associated with the source library that may be present in the project code, identify and mitigate (e.g., by applying fixes to) the vulnerabilities, identify and address licensing incompatibilities, and so on. In this way, the systems and techniques improve the security of software applications being developed, resulting in software applications with fewer vulnerabilities.

In the flow diagrams of FIGS. 4, 5, 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. Though described with reference to FIGS. 1, 2, and 3, the processes 400, 500, 600, 700, and 800 may be implemented using various other models, frameworks, systems and environments.

Figure 4:
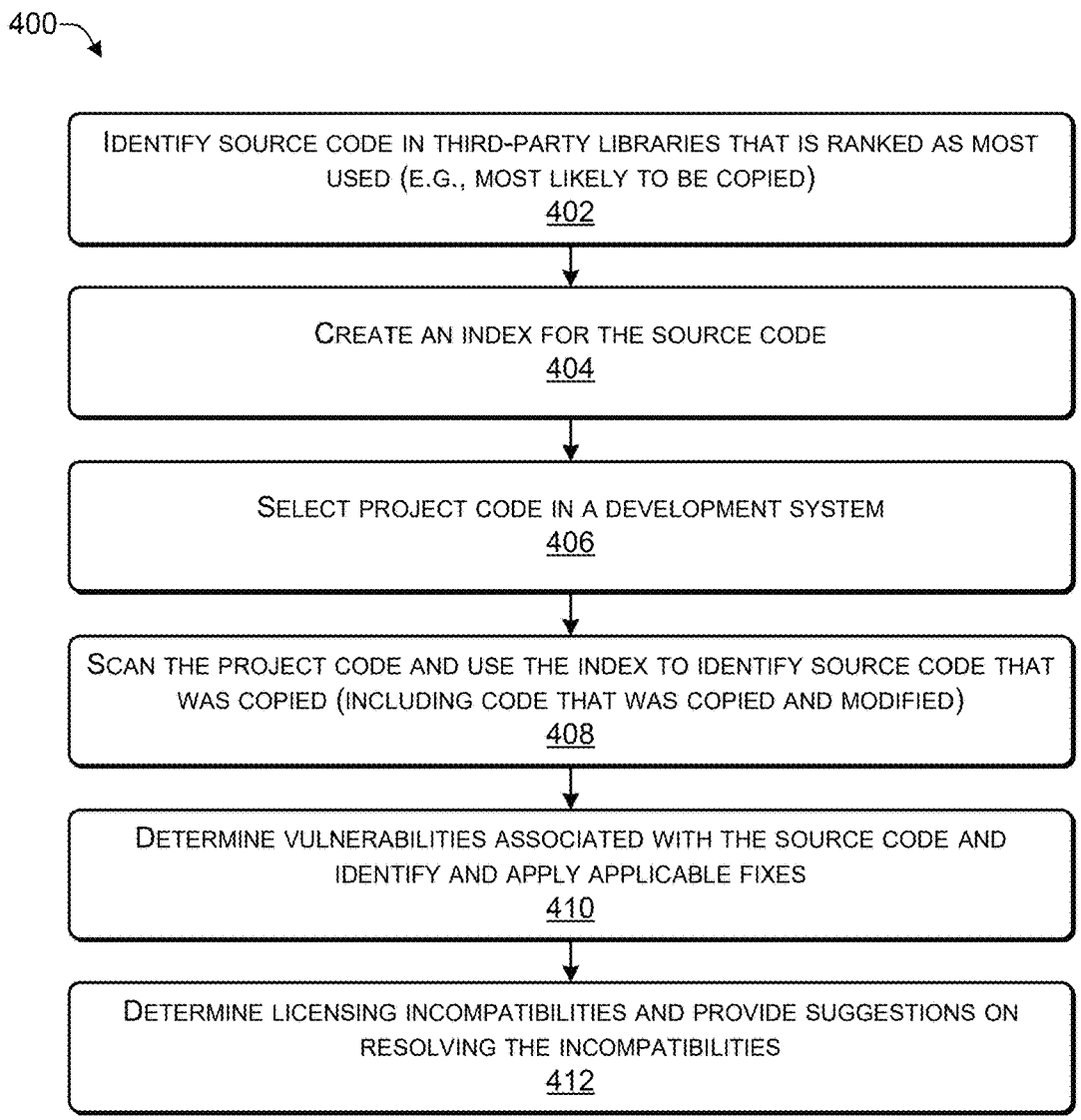
FIG. 4 is an overview of a process to scan project code to identify source code that was copied, according to some embodiments.

FIG. 4 is an overview of a process 400 to scan project code to identify source code that was copied, according to some embodiments. For example, the process 400 may be performed by the scanner 156 of FIGS. 1 and 3.

At 402, the process identify source code and third-party libraries that is ranked as most used (e.g., most likely to be copied). At 404, the process creates an index for the source code. At 406, the process selects project code in a development system. For example, in FIG. 1, the scanner 156 may create the dependency graph 112 based on the third-party libraries 110 and the use a ranking algorithm 114, such as Page Rank, to create the prioritized list 116 of libraries to index. Individual files from the prioritized list 116 are selected to create the selected file 122. The selected file 122 is parsed into multiple blocks 126, 128, and 130. Individual blocks are selected and at least two representations are created, including the signature 138 and the embedding 140. The index 144 is created in the database 142 and includes segment tables 146 that include the signatures 150 and the embeddings 152 associated with the prioritized list 116 of libraries.

At 408, the project code is scanned and the index used to identify source code that was copied (including code that was copied and modified). At 410, the process determines vulnerabilities associated with the source code and identifies and applies applicable fixes. At 412, the process determines licensing incompatibilities and provides suggestions on resolving the incompatibilities. For example, in FIG. 3, individual files 310, 312 from the project code 302 are selected to create the selected code file 314. The selected code file 314 is parsed into multiple blocks 316, 318, 320. Individual blocks are selected and at least two representations are created, including the signature 324 and the embedding 326. The scanner 156 uses the query vector 350 to query the database 142 using the signature 324 and the embedding 326 associated with the selected block 322. If the signature 324 matches one of the signatures 150 in the database 142, then the exact match indicates that the code was copied without modification from the associated source library version. If the signature 324 does not match the signatures 150 in the database 142, then the embedding 326, a vector representation, is compared using a similarity measure, such as cosine similarity, to identify similar embeddings 152 in the database 142. The similar embeddings 152 identify source library versions from which code was copied, modified, and added to the project code 302. The scanner 156 may create an ordered set of source library versions 334 identifying libraries 336 and associated versions 338 from which code was copied (with or without modification). The source library information enables developers to use vulnerability databases 342 identify vulnerabilities 342 and address them using associated fixes 344. The scanner 156 may determine licensing 346 associated with the source libraries and identify incompatibilities. The scanner 156 may present potential solutions to address the licensing incompatibilities.

Figure 5:
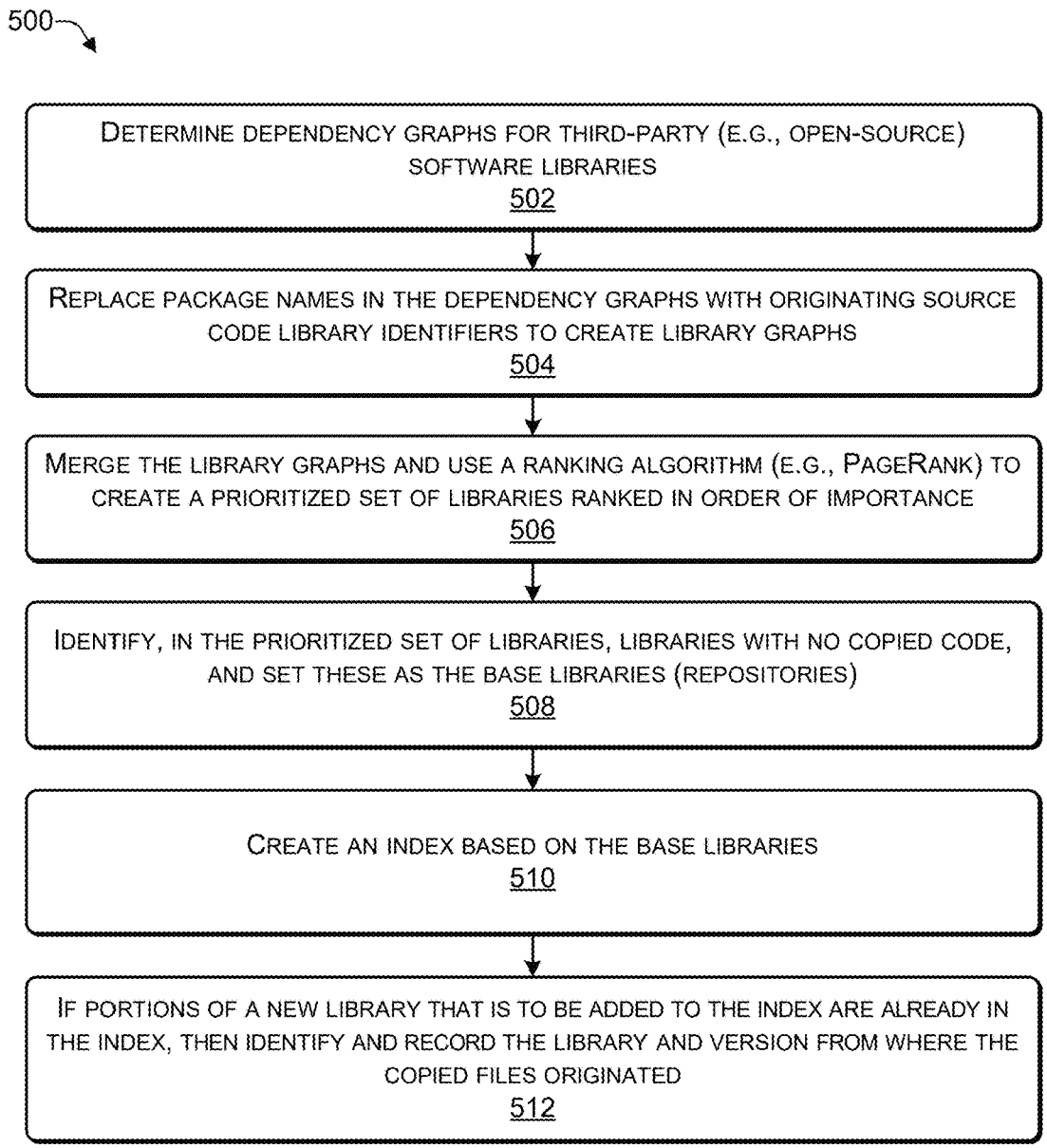
FIG. 5 is a process to create an index of ranked repositories (third-party libraries), according to some embodiments.

FIG. 5 is a process 500 to create an index of ranked repositories (third-party libraries), according to some embodiments. For example, the process 500 may be performed by the scanner 156 of FIG. 1.

At 502, the process may determine dependency graphs for third-party (e.g., open-source) software libraries (also known as repositories or distributions). At 504, the process may replace package names in the dependency graphs with originating source code library identifiers to create library graphs. At 506, the process may merge the library graphs and use a ranking algorithm (e.g., page rank) to create a prioritized set of libraries ranked in order of importance. At 508, the process may identify, in the prioritized set of libraries, libraries with no copied code, and set these as the base libraries (repositories) at 510, the process may create an index based on the base libraries. At 512, the process may, if portions of a new library that is to be added to the index are already in the index, then the process may identify and record the library and version from where the copied files originated. For example, in FIG. 1, the scanner 156 may determine dependency graphs 112 for third-party (e.g., open-source) software libraries 112. The scanner 156 may replace package names in the dependency graphs 112 with originating source code library identifiers to create library graphs. The scanner 156 may merge the library graphs and use a ranking algorithm 114 (e.g., Page Rank) to create a prioritized set of libraries 116 ranked in order of importance. The AI 121 may identify, in the prioritized set of libraries 116, libraries with no copied code, and set these as the base libraries (repositories) 120. The scanner 156 may create the index 144 based on the base libraries 120. If portions of a new library that is to be added to the index 144 are already in the index 144, then the scanner 156 may identify and record the library and version from where the copied files originated.

Figure 6:
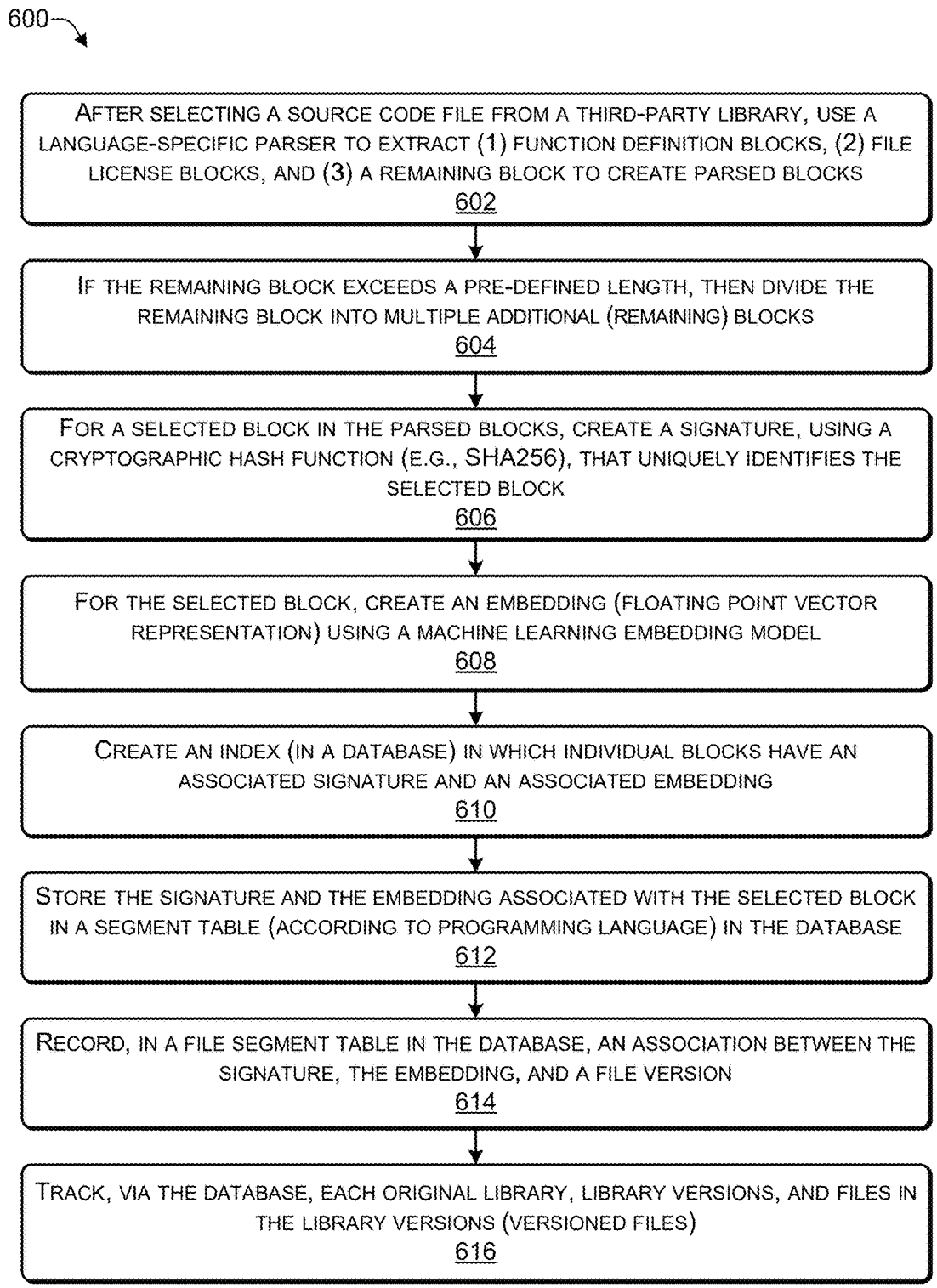
FIG. 6 is a process to create a signature and an embedding for individual blocks from a source code file, according to some embodiments.

FIG. 6 is a process 600 to create a signature and an embedding for individual blocks from a source code file, according to some embodiments. For example, the process 600 may be performed by the scanner 156 of FIG. 1.

At 602, after selecting a source code file in a third-party library, the process uses a parser to extract function definition blocks, file license blocks, and remaining block(s), to create parsed blocks. At 604, if the remaining block(s) exceed a predefined length, then the process divides the remaining block(s) into multiple additional (remaining) blocks. At 606, for a selected block in the parsed blocks, the process creates a signature, using a cryptographic hash function (e.g., SHA 256), that uniquely identifies the selected block. At 608, for the selected block, the process creates an embedding (a floating-point vector representation) using a machine learning embedding model. At 610, the process creates an index in a database in which individual blocks have an associated signature and an associated embedding. At 612, the process stores the signature and the embedding associated with the selected block in a segment table, according to programming language, in the database. At 614, the process records, in a file segment table in the database, an association between (i) the signature, the embedding and (ii) a file version. At 616, the process tracks, via the database, each original library, library versions, and files in the library versions (version files). For example, in FIG. 1, for the selected file 122 from the third libraries 110 (e.g., from the base libraries 120), the scanner 156 uses a programming language specific parser 124 to extract function definition blocks 126, file license blocks 128, and remaining block(s) 130, to create parsed blocks. If the remaining block(s) 130 exceeds a predefined length, then the scanner 156 divides the remaining block(s) 130 into multiple additional (remaining) blocks. For a selected block 132 (of the parsed blocks 126, 128, 130), the scanner 156 creates a signature 138, using a cryptographic hash function 134 (e.g., SHA 256), that uniquely identifies the selected block 132. For the selected block 132, the scanner 156 creates an embedding 140 (a floating-point vector representation) using a machine learning embedding model 136. The scanner 156 creates an index 144 in a database 142 in which individual blocks have an associated signature 150 and an associated embedding 152. In FIG. 2, the scanner 156 stores the signature 150 and the embedding 152 associated with the selected block in a segment table 146, according to programming language 148, in the database 142. The scanner 156 records, in the file segment tables 146 in the database 142, an association 153 between (i) the signature 150, the embedding 152 and (ii) a file version 206. The scanner 156 tracks, via the database 142, each original library 204, library versions 206, and versioned files 208.

Figure 7:
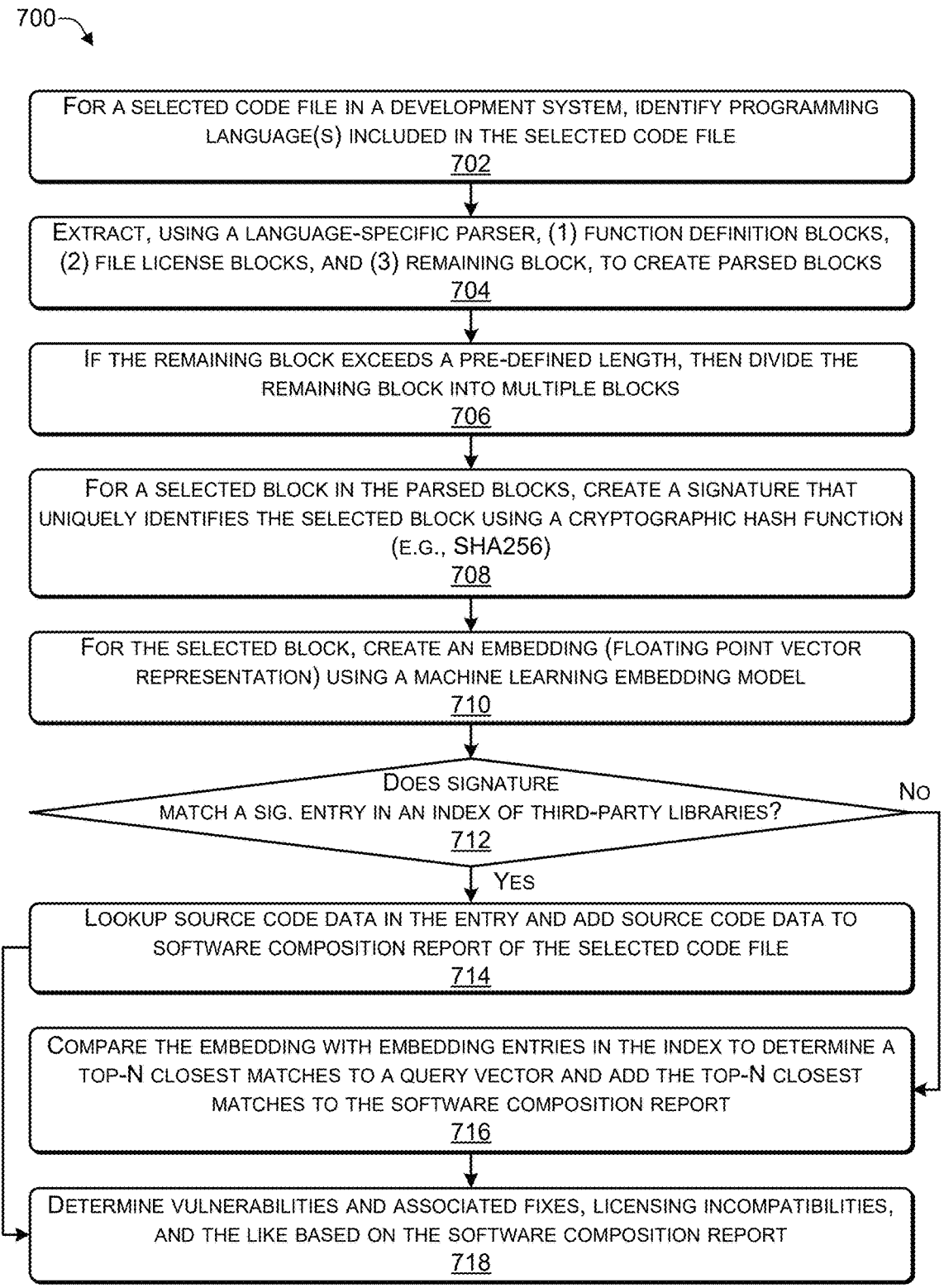
FIG. 7 is a process to identify code in a development system that was copied from one or more third-party libraries, according to some embodiments.

FIG. 7 is a process 700 to identify code in a development system that was copied from one or more third-party libraries, according to some embodiments. For example, the process 700 may be performed by the scanner 156 of FIG. 3.

At 702, the process may for a selected code file in the development system, identify a programming language included in the selected code file. At 704, the process may extract, using a programming language-specific parser, function definition blocks, file license blocks, and remaining block(s), to create parsed blocks. At 706, if the remaining block(s) exceeds a predefined length, then the process divides the remaining block(s) into multiple additional (remaining) blocks. At 708, for a selected block in the parsed blocks, create a signature that uniquely identifies the selected block using a cryptographic hash function (e.g., SHA 256). At 710, for the selected block, create an embedding (floating-point vector representation) using a machine learning embedding model. For example, in FIG. 3, the scanner 156 may select a code file 310, 312 from the development system 108 to create the selected code file 314 and identify a programming language 308 included in the selected code file. The scanner 156 may extract, using a programming language-specific parser 124, function definition blocks 316, file license blocks 318, and remaining block(s) 320, to create parsed blocks. If the remaining block(s) 320 exceeds a predefined length, then the scanner 156 divides the remaining block(s) 320 into multiple additional (remaining) blocks. For a selected block 322 (of the parsed blocks 316, 318, 320), the scanner 156 creates a signature 324 that uniquely identifies the selected block 322 using a cryptographic hash function 134 (e.g., SHA 256). For the selected block 322, the scanner 156 creates an embedding 326 (floating-point vector representation) using a machine learning embedding model 136.

At 712, the process determines whether the signature matches a signature entry in an index of third-party libraries. If the process determines, at 712, that "yes" the signature matches a signature entry in an index of third-party libraries, then the process proceeds to 714. If the process determines, at 712, that "no" the signature fails to match a signature entry in the index of third-party libraries, then the process proceeds to 716. At 714, the process looks up source code data in the entry in the index and adds the source code data to a software composition report of the selected code file. The process then proceeds to 718. At 716, the process compares the embedding with embedding entries in the index to determine a top-N closest matches to a query vector and adds the top-N closest matches to the software composition report. The process then proceeds to 718. At 718, the process determines vulnerabilities and associated fixes, licensing code incompatibilities, and the like based on the software composition report. For example, in FIG. 3, the scanner 156 determines whether the signature 324 matches a signature entry 150 in an index 144 of third-party libraries 110. If the scanner 156 determines, that "yes" the signature 324 matches a signature entry 150 in an index 144 of third-party libraries 110, then the scanner 156 looks up source code data 336, 338 in the database 142 (see FIG. 2) and adds the source code data 336, 338 to results 328 (a software composition report) of the selected code file 314. If the scanner 156 determines, that "no" the signature fails to match a signature entry 150 in the index 144 of third-party libraries 110, then the scanner 156 compares the embedding 326 with embedding entries 152 in the index 144 to determine a top-N closest matches to a query vector 350 and adds the top-N closest matches to the results 328 (software composition report). After the results 328 associated with the selected code file 314 have been determined, the scanner 156 determines vulnerabilities 342 and associated fixes 344, licensing 346 incompatibilities, and the like based on the results 328 (software composition report).

Figure 8:
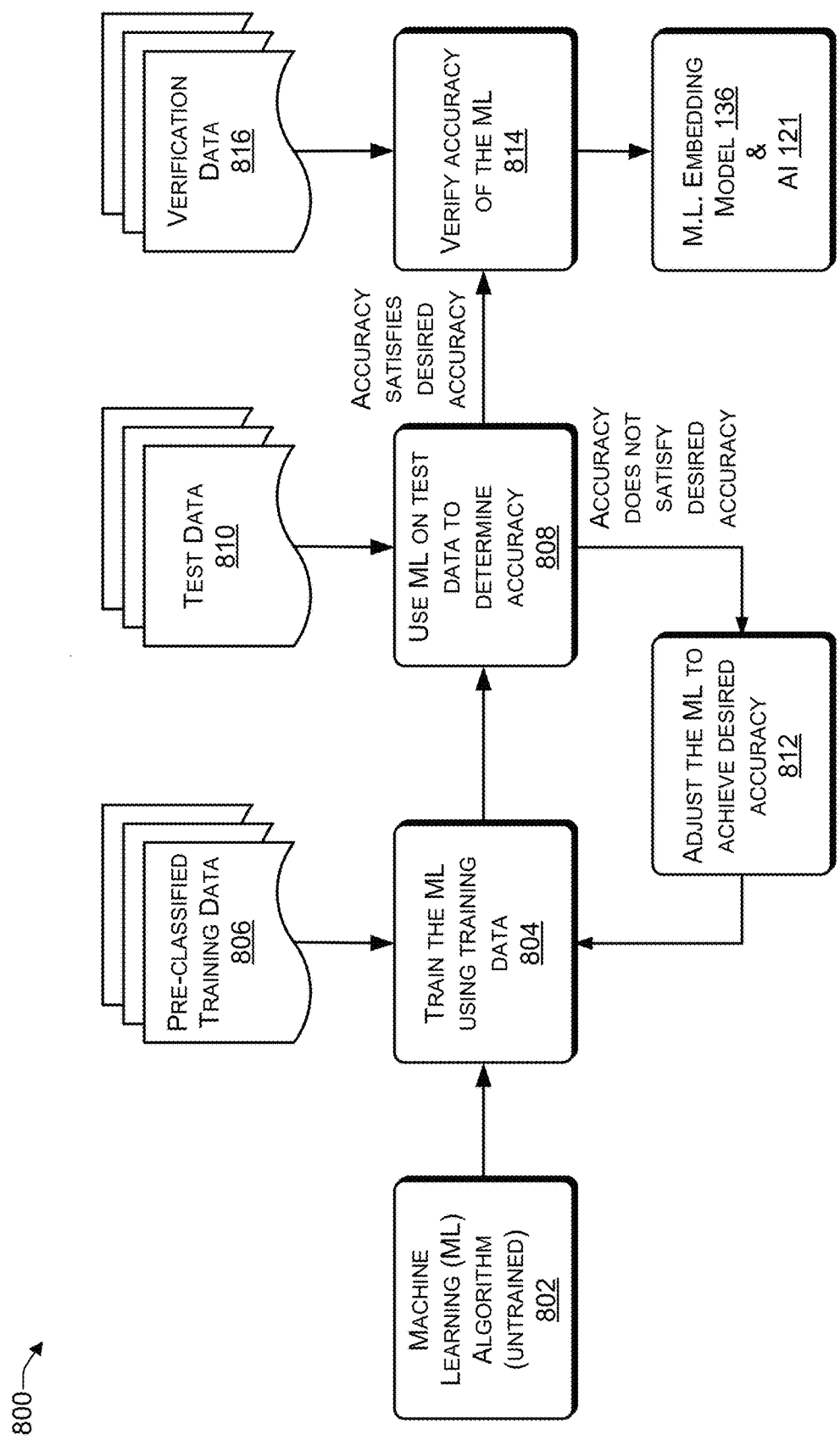
FIG. 8 is a process to create a trained machine learning (AI) embedding model, according to some embodiments.

FIG. 8 is a process 800 to create a trained machine learning model, according to some embodiments. For example, the process 800 may be used by the server 102 to create the AI 121 and the machine learning embedding model 136 of FIGS. 1 and 3.

At 802, a machine learning algorithm (e.g., software code that has not yet been trained) may be created by one or more software designers. At 804, the machine learning algorithm may be trained using pre-classified training data 806 (e.g., a portion of the training data that has been pre-classified). For example, the training data 806 may have been pre-classified by humans, by machine learning, or a combination of both. After the machine learning has been trained using the pre-classified training data 806, the machine learning may be tested, at 808, using test data 810 to determine an accuracy of the machine learning. For example, in the case of a classifier, the accuracy of the classification may be determined using the test data 610.

If an accuracy of the machine learning does not satisfy a desired accuracy (e.g., 95%, 98%, 99% accurate), at 808, then the software code of the machine learning model may be modified (e.g., adjusted), at 812, to achieve the desired accuracy. For example, at 812, the software designers may modify the machine learning software code to improve the accuracy of the machine learning algorithm. After the machine learning has been tuned, at 812, the machine learning may be retrained, at 804, using the pre-classified training data 806. In this way, 804, 808, 812 may be repeated until the machine learning is able to classify the test data 810 with the desired accuracy.

After determining, at 808, that an accuracy of the machine learning satisfies the desired accuracy, the process may proceed to 814, where verification data 816 may be used to verify an accuracy of the machine learning. After the accuracy of the machine learning is verified, at 814, the machine learning embedding model 136 and/or the AI 121 may be used as described herein.

Figure 9:
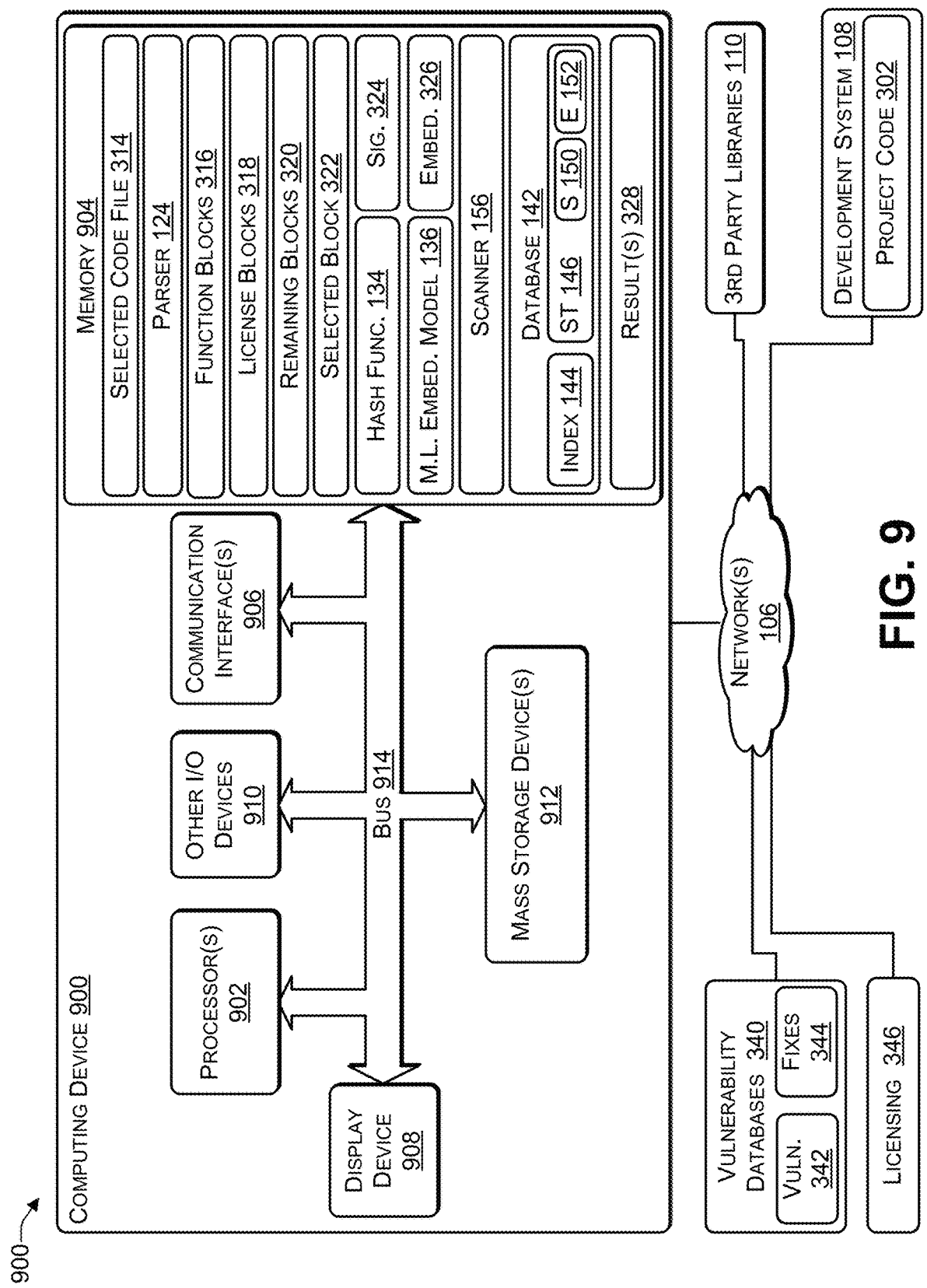
FIG. 9 illustrates an example configuration of a computing device that can be used to implement the systems and techniques described herein.

FIG. 9 illustrates an example configuration of a computing device 900 that can be used to implement the systems and techniques described herein, such as the servers 102, the remote servers 104, or hosting the development system 108 of FIG. 1. Purely for illustration purposes, the computing device 900 is shown as implementing the server 102.

The computing device 900 may include one or more processors 902 (e.g., central processing unit (CPU), graphics processing unit (GPU), AI processing units (AIPU), or any combination thereof), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., Thunder-Bolt®, digital video interface (DVI), High-Definition Multimedia Interface (HDMI), and the like), power buses, etc.

The processors 902 are one or more hardware devices that may include a single processing unit or a number of processing units, all of which may include single or multiple computing units or multiple cores. The processors 902 may include a GPU and/or AIPU that is integrated into the CPU or the GPU and/or AIPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 are configured to fetch and execute computer-readable instructions stored in the memory 904, mass storage devices 912, and other types of non-transitory computer-readable media.

Memory 904 and mass storage devices 912 are examples of non-transitory computer storage media (e.g., memory storage devices) for storing instructions that can be executed by the processors 902 to perform the various functions described herein. For example, memory 904 may include both volatile memory and non-volatile memory (e.g., random access memory (RAM), read only memory (ROM), or the like) devices. Further, mass storage devices 912 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 904 and mass storage devices 912 may be collectively referred to as memory or computer storage media herein and include any type of non-transitory media capable of storing computer-readable, processor-executable program instructions as computer program code that can be executed by the processors 902 as a particular machine configured for carrying out the operations and functions described in the implementations herein.

The computing device 900 may include one or more communication interfaces 906 for exchanging data via the network(s) 106. The communication interfaces 906 can facilitate communications within a wide variety of networks and protocol types, such as a representative network 916 that may include wired networks (e.g., Ethernet, Data Over Cable Service Interface Specification (DOCSIS), digital subscriber line (DSL), Fiber, universal serial bus (USB) etc.) and wireless networks (e.g., wireless local area network (WLAN), global system for mobile (GSM), code division multiple access, CDMA, WiFi (IEEE 802.11), Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data as shown in FIG. 9.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   selecting a code file in a development system to create a selected code file;
   identifying a programming language included in the selected code file;
   selecting a language-specific parser based on the programming language;
   segmenting the selected code file, using the language-specific parser, to create multiple parsed blocks comprising:
   function definition blocks;
   file license blocks; and
   at least one remaining block;
   selecting a block of the multiple parsed blocks to create a selected block;
   creating, using a cryptographic hash function and based on the selected block, a block signature that uniquely identifies the selected block;
   comparing the block signature to multiple signatures of blocks in third-party libraries, the multiple signatures located in an index;
   based at least in part on determining that the block signature matches one of the multiple signatures of blocks in third-party libraries:
   determining, using the index, a source file from which the selected block was copied; and
   adding a source file identifier associated with the source file to a software composition report of the selected code file;
   identifying, based on the software composition report, one or more vulnerabilities included in the source file to create identified vulnerabilities;
   identifying, based on the one or more vulnerabilities, one or more fixes to address the vulnerabilities to create identified fixes; and
   providing the software composition report, the identified vulnerabilities, and the identified fixes to a software developer associated with the selected code file to enable the software developer to apply the identified fixes to the identified vulnerabilities.

2. The computer-implemented method of claim 1, further comprising:
   determining, based on the software composition report, one or more licensing incompatibilities associated with the selected code file; and
   providing one or more suggestions on addressing the one or more licensing incompatibilities associated with the selected code file.

3. The computer-implemented method of claim 1, further comprising:
   creating, using a machine learning embedding model and based on the selected block, a block embedding comprising a floating-point vector representation of the selected block;
   based at least in part on determining that the block signature fails to match any of the multiple signatures of the blocks in the third-party libraries, comparing the block embedding to multiple embeddings of the blocks in the third-party libraries, the multiple embeddings located in the index; and
   determining that the block embedding matches, in the index, one or more embeddings of the multiple embeddings of the blocks in the third-party libraries;
   determining, using the index and based on the one or more embeddings that match the block embedding, one or more additional source files; and
   adding the one or more additional source files to the software composition report of the selected code file.

4. The computer-implemented method of claim 3, further comprising:
   ordering the one or more embeddings that match the block embedding based on a similarity measure to create an ordered set of matching embeddings ordered from closest match to least closest match.

5. The computer-implemented method of claim 4, wherein the similarity measure comprises a vector cosine distance.

6. The computer-implemented method of claim 1, further comprising:
   determining a size of the at least one remaining block; and
   based on determining that the size of the at least one remaining block exceeds a predetermined size, dividing the at least one remaining block into smaller remaining blocks.

7. The computer-implemented method of claim 1, further comprising:
   identifying, based on the software composition report, one or more licensing incompatibilities; and
   providing at least one suggestion to address the one or more licensing incompatibilities.

8. A server comprising:
   one or more processors; and
   one or more non-transitory computer readable media storing instructions executable by the one or more processors to perform operations comprising:
   selecting a code file in a development system to create a selected code file;
   identifying a programming language included in the selected code file;
   selecting a language-specific parser based on the programming language;
   segmenting the selected code file, using the language-specific parser, to create multiple parsed blocks comprising:
   function definition blocks;
   file license blocks; and
   at least one remaining block;
   selecting a block of the multiple parsed blocks to create a selected block;
   creating, using a cryptographic hash function and based on the selected block, a block signature that uniquely identifies the selected block;
   comparing the block signature to multiple signatures of blocks in third-party libraries, the multiple signatures located in an index;
   based at least in part on determining that the block signature matches one of the multiple signatures of blocks in third-party libraries:
   determining, using the index, a source file from which the selected block was copied; and adding a source file identifier associated with the source file to a software composition report of the selected code file;

identifying, based on the software composition report, one or more vulnerabilities included in the source file to create identified vulnerabilities;

identifying, based on the one or more vulnerabilities, one or more fixes to address the vulnerabilities to create identified fixes; and providing the software composition report, the identified vulnerabilities, and the identified fixes to a software developer associated with the selected code file to enable the software developer to apply the identified fixes to the identified vulnerabilities.

9. The server of claim 8, wherein creating the index comprises:

determining a dependency graph for individual third-party software libraries of multiple software libraries to create multiple dependency graphs of the multiple software libraries;

merging the dependency graphs to create a consolidated dependency graph; and creating, using a ranking algorithm, a prioritized set of libraries ranked in order of importance, the prioritized set of libraries including no more than a predetermined number of libraries.

10. The server of claim 9, wherein:
the ranking algorithm comprises PageRank.

11. The server of claim 9, the operations further comprising:

determining, based on the prioritized set of libraries, one or more libraries that do not include copied code;

designating the one or more libraries that do not include copied code as base libraries; and creating the index using the base libraries.

12. The server of claim 8, the operations further comprising:

receiving a request to add a new library to the index;

based on determining that a portion of the new library is already included in the index, identifying a particular library of the third-party libraries from which the portion originated; and adding information to the index indicating that the portion of the new library originated from the particular library.

13. The server of claim 8, wherein the source file identifier comprises:

a file identifier identifying the source file; and a version identifier identifying a version of the source file.

14. The server of claim 8, wherein the at least one remaining block includes data structure declarations and constants from the selected file.

15. One or more non-transitory computer readable media capable of storing instructions executable by one or more processors to perform operations comprising:

selecting a code file in a development system to create a selected code file;

identifying a programming language included in the selected code file;

selecting a language-specific parser based on the programming language;

segmenting the selected code file, using the language-specific parser, to create multiple parsed blocks comprising:

function definition blocks;

file license blocks; and at least one remaining block;

selecting a block of the multiple parsed blocks to create a selected block;

creating, using a cryptographic hash function and based on the selected block, a block signature that uniquely identifies the selected block;

comparing the block signature to multiple signatures of blocks in third-party libraries, the multiple signatures located in an index;

based at least in part on determining that the block signature matches one of the multiple signatures of blocks in third-party libraries:

determining, using the index, a source file from which the selected block was copied; and adding a source file identifier associated with the source file to a software composition report of the selected code file;

identifying, based on the software composition report, one or more vulnerabilities included in the source file to create identified vulnerabilities;

identifying, based on the one or more vulnerabilities, one or more fixes to address the vulnerabilities to create identified fixes; and providing the software composition report, the identified vulnerabilities, and the identified fixes to a software developer associated with the selected code file to enable the software developer to apply the identified fixes to the identified vulnerabilities.

16. The one or more non-transitory computer readable media of claim 15, the operations further comprising:

determining, based on the software composition report, one or more licensing incompatibilities associated with the selected code file; and providing one or more suggestions on addressing the one or more licensing incompatibilities associated with the selected code file.

17. The one or more non-transitory computer readable media of claim 16, the operations further comprising:

creating, using a machine learning embedding model and based on the selected block, a block embedding comprising a floating-point vector representation of the selected block;

based at least in part on determining that the block signature fails to match any of the multiple signatures of the blocks in the third-party libraries, comparing the block embedding to multiple embeddings of the blocks in the third-party libraries, the multiple embeddings located in the index; and determining that the block embedding matches, in the index, one or more embeddings of the multiple embeddings of the blocks in the third-party libraries;

determining, using the index and based on the one or more embeddings that match the block embedding, one or more additional source files; and adding the one or more additional source files to the software composition report of the selected code file.

18. The one or more non-transitory computer readable media of claim 17, the operations further comprising:

ordering the one or more embeddings that match the block embedding based on a similarity measure to create an ordered set of matching embeddings ordered from closest match to least closest match, the similarity measure comprising a vector cosine distance.

19. The one or more non-transitory computer readable media of claim 18, the operations further comprising:

determining a dependency graph for individual third-party software libraries of multiple software libraries to create multiple dependency graphs of the multiple software libraries;

merging the dependency graphs to create a consolidated dependency graph;

creating, using a ranking algorithm, a prioritized set of libraries ranked in order of importance, the prioritized set of libraries including no more than a predetermined number of libraries;

determining, based on the prioritized set of libraries, one or more libraries that do not include copied code;

designating the one or more libraries that do not include copied code as base libraries; and creating the index using the base libraries.

20. The one or more non-transitory computer readable media of claim 15, wherein:

the source file identifier comprises:

a file identifier identifying the source file; and a version identifier identifying a version of the source file.

* * * * *